(12) United States Patent
Oh

(10) Patent No.: US 12,095,875 B2
(45) Date of Patent: Sep. 17, 2024

(54) DYNAMIC USER PROFILES BASED ON INTERACTIONS BETWEEN USERS

(71) Applicant: Zoom Video Communications, Inc., San Jose, CA (US)

(72) Inventor: Randy Oh, Lewisville, TX (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/731,208

(22) Filed: Apr. 27, 2022

(65) Prior Publication Data

US 2023/0353649 A1    Nov. 2, 2023

(51) Int. Cl.
| | | |
|---|---|---|
| *H04L 67/50* | (2022.01) | |
| *H04L 67/306* | (2022.01) | |
| *H04L 51/216* | (2022.01) | |
| *H04L 51/52* | (2022.01) | |

(52) U.S. Cl.
CPC .......... *H04L 67/535* (2022.05); *H04L 67/306* (2013.01); *H04L 51/216* (2022.05); *H04L 51/52* (2022.05)

(58) Field of Classification Search
CPC ..... H04L 67/306; H04L 67/535; H04L 43/08; H04L 51/046; H04L 51/52; H04L 51/216; G06F 16/285
See application file for complete search history.

(56) References Cited

U.S. PATENT DOCUMENTS

| | | | |
|---|---|---|---|
| 8,972,414 B2 | 3/2015 | Posse et al. | |
| 9,720,975 B2 | 8/2017 | Zaman et al. | |
| 10,380,205 B2 | 8/2019 | Moxon et al. | |
| 11,094,031 B2 | 8/2021 | Baggerman | |
| 2014/0066044 A1* | 3/2014 | Ramnani | H04L 67/306 455/418 |
| 2018/0027118 A1 | 1/2018 | Sharpe et al. | |
| 2019/0096007 A1 | 3/2019 | Xie et al. | |
| 2019/0251073 A1* | 8/2019 | Dasari | G06F 16/285 |
| 2019/0361872 A1* | 11/2019 | Wulf | G06F 21/6218 |
| 2020/0257991 A1* | 8/2020 | Gelinas | G06N 5/04 |
| 2020/0372016 A1* | 11/2020 | Rogynskyy | G06Q 10/107 |
| 2021/0150623 A1* | 5/2021 | Rostami | G06V 40/20 |
| 2021/0374030 A1* | 12/2021 | Guo | G06Q 10/1091 |
| 2022/0014571 A1* | 1/2022 | Polish | G06N 20/00 |
| 2022/0327378 A1* | 10/2022 | Rangan | G06N 3/047 |
| 2022/0365756 A1* | 11/2022 | Vasireddy | G06F 18/214 |
| 2022/0382820 A1* | 12/2022 | Zagat | H04L 67/535 |

* cited by examiner

*Primary Examiner* — Jungwon Chang
(74) *Attorney, Agent, or Firm* — Young Basile Hanlon & MacFarlane, P.C.

(57) ABSTRACT

A software platform monitors interactions between two or more users of the software platform to determine an interaction metric between the two or more users. The interaction metric is based on a level of interaction between the two or more users. The software platform receives a request from a device of a first user for a dynamic user profile of a second user. The software platform obtains profile information of the second user based on the interaction metric. The software platform generates the dynamic user profile of the second user based on the obtained profile information. The software platform transmits the dynamic user profile of the second user to the device of the first user for display.

20 Claims, 8 Drawing Sheets

DYNAMIC USER PROFILES BASED ON INTERACTIONS BETWEEN USERS

FIELD

This disclosure generally relates to dynamic user profiles, and, more specifically, to user profiles that are updated based on interactions between two or more users.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
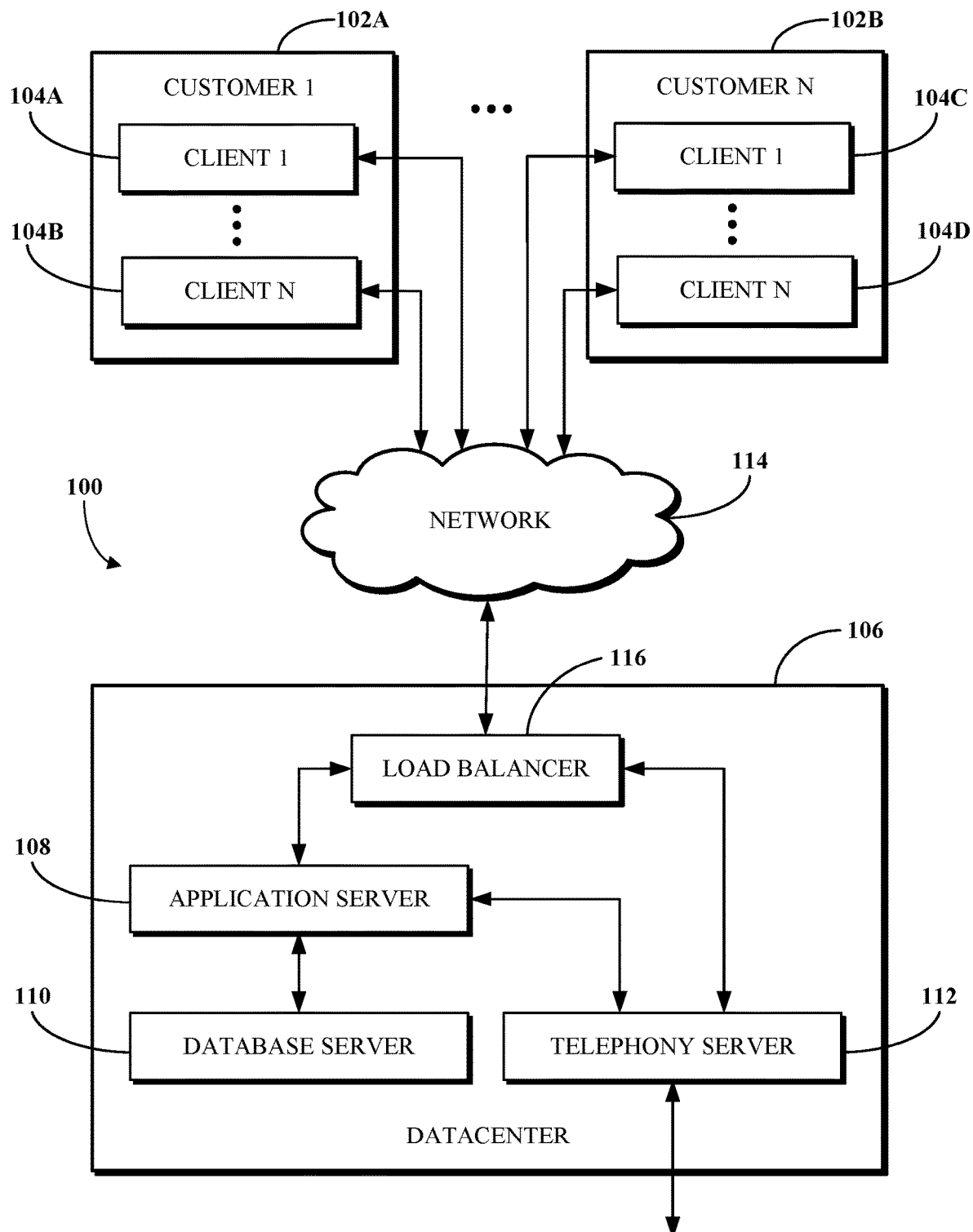
FIG. 1 is a block diagram of an example of an electronic computing and communications system.

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

Software platforms such as UCaaS platforms can implement user profiles that store information of a given user for viewing by other users. Conventional user profiles are limited to static information (e.g., biographical or status information) of a given user that is identically presented to all users of the UCaaS platform, regardless of degrees of relationships between those users and the given user. As such, a conventional user profile does not show relevant relationship information between users or change the information presented for viewing based on such a relationship. For example, a user may only be interested in another user's title or location when interacting with the other user for the first time. After the user has had a few interactions with the other user, the other user's title or location may no longer be of interest to the user as it is already well-known to them. Thus, conventional UCaaS platforms suffer shortcomings in that they are not configured to update user profiles to show information that may be relevant to a specific user at a given time. Given the generally limited space available for viewing information within a user profile, it would be desirable for user profiles to become dynamic to enable relevant information based on inferred relationships between users to be presented in lieu of conventional, static information.

Implementations of this disclosure address problems such as these by providing systems and methods that intelligently update user profiles based on the relationship between a user that is requesting to view a user profile (e.g., the requesting user) and a user whose profile is being requested (e.g., the target user). These implementations include generating a dynamic user profile that is based on a level of interaction between the requesting user and the target user such that a contact view of a profile card of the target user will adapt to show information that is relevant to the requesting user's needs at a given time. The dynamic user profile includes information about the target user, and also information about the interactions between the target user and the requesting user. The dynamic user profile can be updated to include information from third party applications, recent chats, shared public channels, recent conferences, future conferences, and the like. The dynamic user profile can be scaled such that it can be applied to a team. In such a case, the dynamic user profile functions as a team workspace with similar useful related items that surface for productivity without having to log into another service.

To describe some implementations in greater detail, reference is first made to examples of hardware and software structures used to implement dynamic user profiles. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over Internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
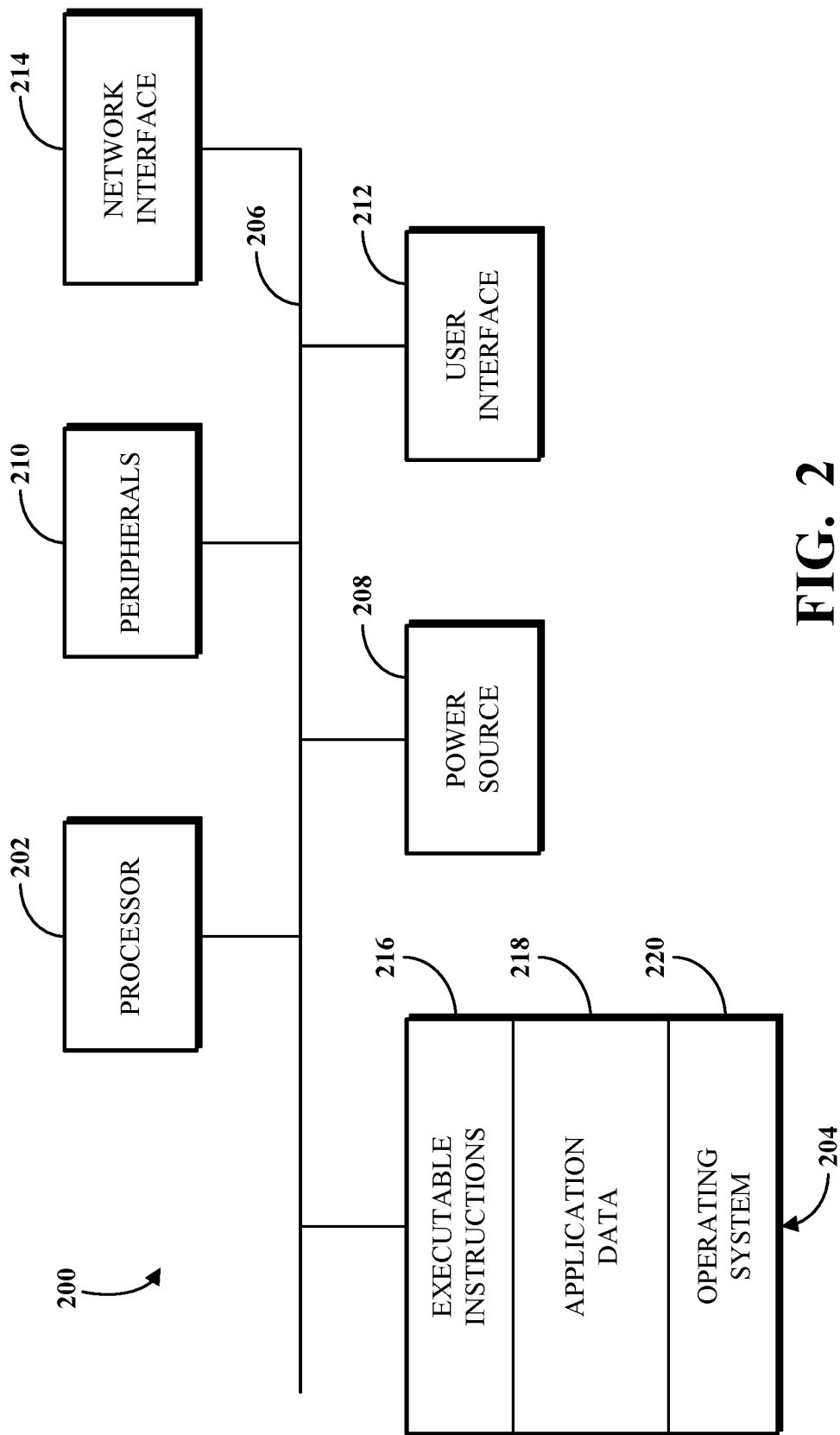
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
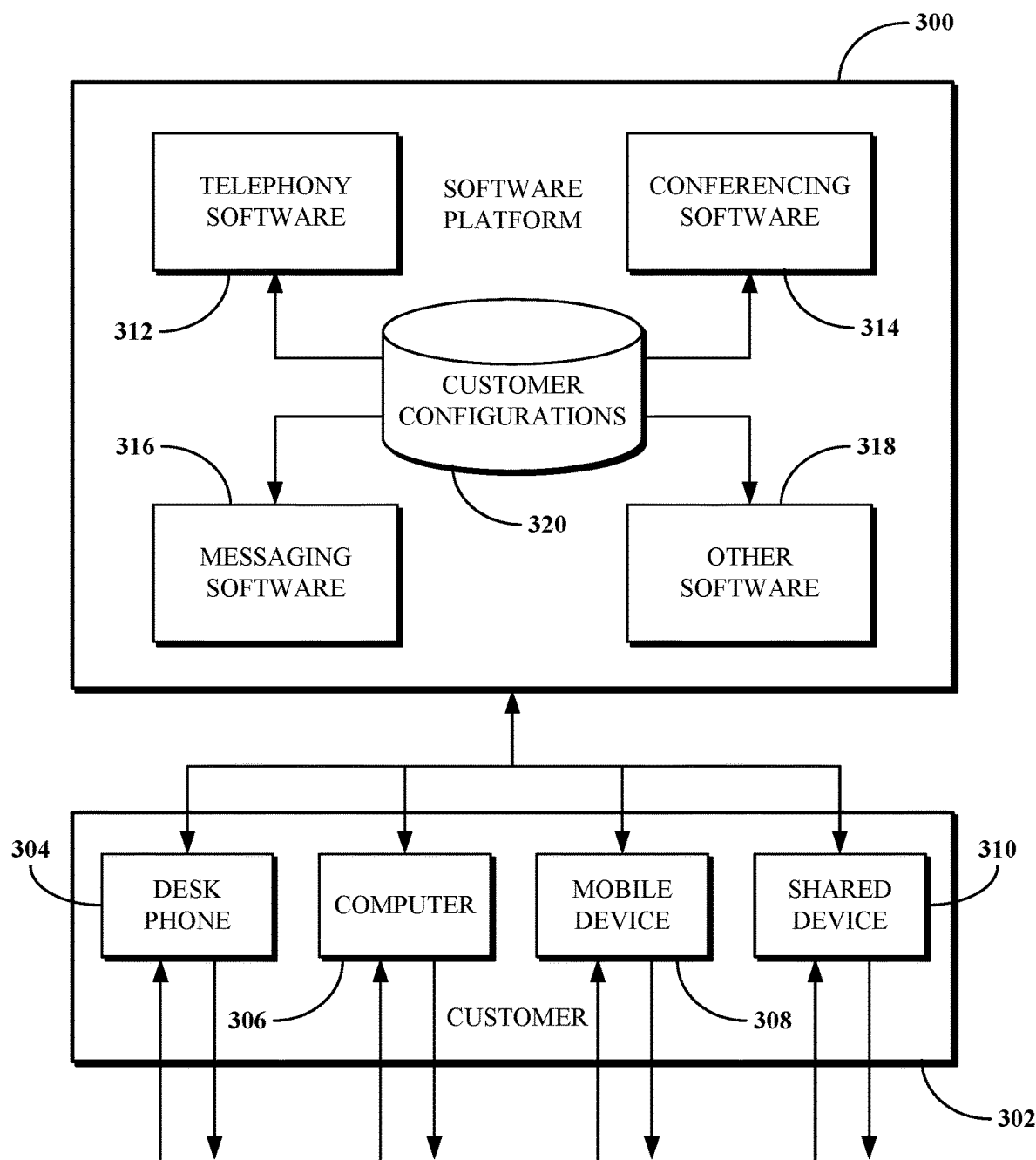
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include interaction monitoring functionality, dynamic user profile generation functionality, or both.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
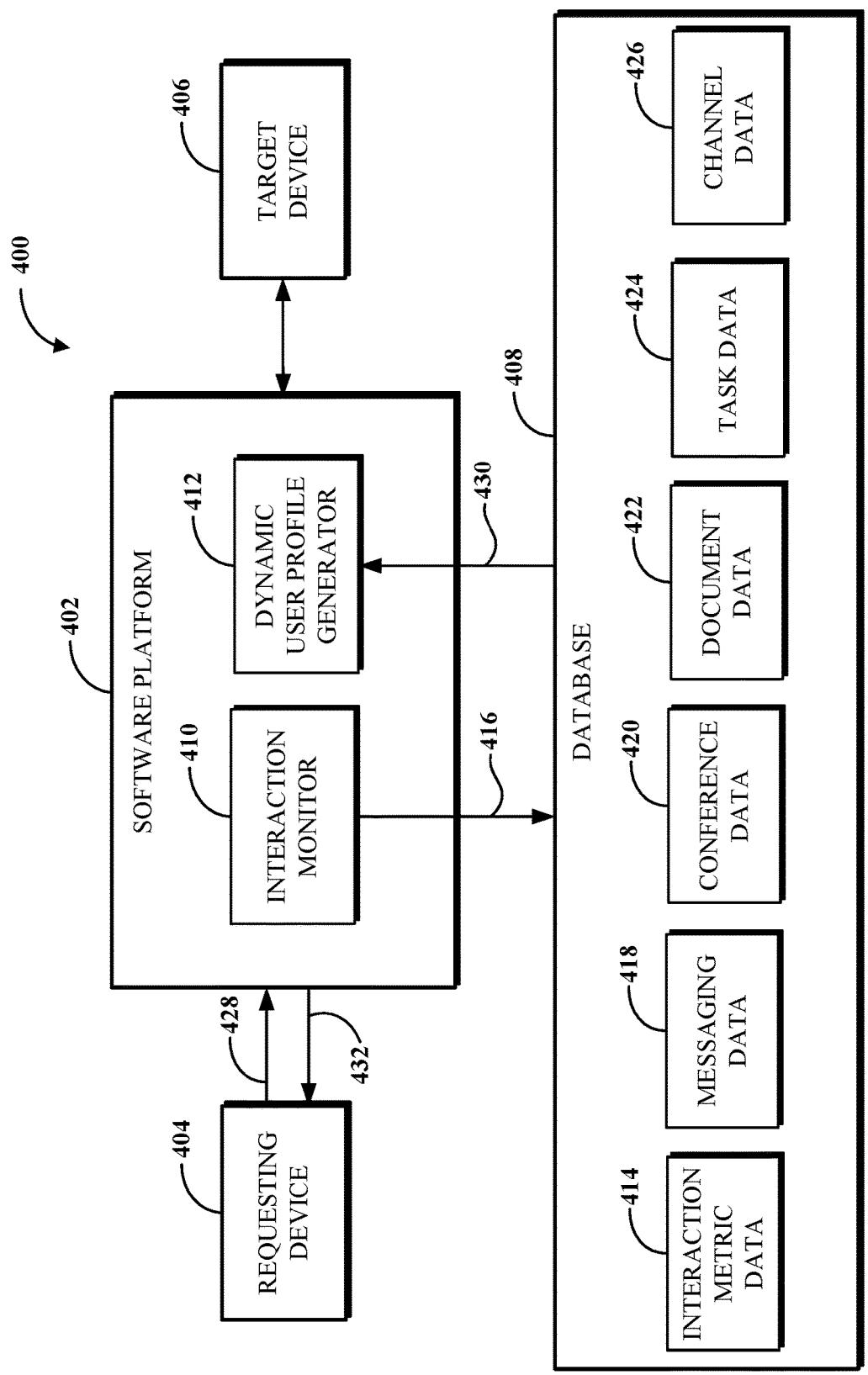
FIG. 4 is a block diagram of an example of a system for generating dynamic user profiles.

FIG. 4 is a block diagram of an example of a system 400 for generating dynamic user profiles. The system 400 includes a software platform 402, such as the software platform 300 shown in FIG. 3, a requesting device 404, a target device 406, and a database 408. The requesting device 404 and the target device 406 may each be client devices (e.g., one of the clients 304 through 310 shown in FIG. 3) and may be configured to communicate with each other via the software platform 402. The system 400 may include more than two devices, and two devices are shown in FIG. 4 for simplicity and clarity. The database 408 may be implemented by a database server, such as the database server 110 shown in FIG. 1.

As shown in FIG. 4, the software platform 402 includes an interaction monitor 410 and a dynamic user profile generator 412. The interaction monitor 410 is software configured to monitor interactions between a user of the requesting device 404 and a user of the target device 406 over a software service of the software platform 402. The interactions between the user of the requesting device 404 and the user of the target device 406 may include, for example, one or more of telephone calls, chats, emails, shared conferences, shared documents, shared tasks, shared channels, and the like. The interaction monitor 410 is configured to process real-time interactions and/or records of previous interactions between the user of the requesting device 404 and the user of the target device 406 to determine an interaction metric between the user of the requesting device 404 and the user of the target device 406. The interaction metric represents a level of interaction determined between the user of the requesting device 404 and the user of the target device 406 based on the real-time interactions and/or records of previous interactions. The level of interaction may be based on at least one of a number of interactions between the user of the requesting device 404 and the user of the target device 406 over a software service of the software platform 402, a duration of at least one interaction between the user of the requesting device 404 and the user of the target device 406 over a software service of the software platform 402, a frequency of interactions between the user of the requesting device 404 and the user of the target device 406 over a software service of the software platform 402, a number of shared files between the user of the requesting device 404 and the user of the target device 406 over a software service of the software platform 402, a number of shared tasks between the user of the requesting device 404 and the user of the target device 406 over a software service of the software platform 402, a number of prior shared conferences between the user of the requesting device 404 and the user of the target device 406 over a software service of the software platform 402, or a number of future shared conferences between the user of the requesting device 404 and the user of the target device 406 over a software service of the software platform 402. The interaction metric may, for example, be determined as an integer value on a defined scale (e.g., 1 through 10) and stored, for example, as interaction metric data 414 in database 408. The determined interaction metric increases as the number, frequency, and/or duration of the interactions increases and may in some cases similarly decrease. The interaction metric may in some cases be updated in real-time, such as based on real-time interactions.

The interaction monitor 410 is configured to extract data from the interactions as interaction data 416, categorize the interaction data 416 into messaging data, conference data, document data, task data, and channel data, and transmit the interaction data 416 to the database 408 for storage. Categorizing the interaction data 416 may include tagging, or otherwise indicating, respective portions of the interaction data 416 as messaging data, conference data, document data, task data, and channel data. The database 408 is configured to store the respective portions of the interaction data 416 as messaging data 418, conference data 420, document data 422, task data 424, and channel data 426, for example, based on an associated tag or indicator of the respective portions of the interaction data 416.

The messaging data 418 may include data from email applications, data from instant messaging applications, data from unified messaging applications, and data from other messaging applications between multiple devices, such as chat applications. In one example, the messaging data 418 may include data associated with one or more public or private user-to-user chat rooms or group chat rooms. Such chat rooms may be instantiated for a limited term or persistent. In some such cases, the chat rooms may be organized by topic. In another example, the messaging data 418 may include subject data, participant data, and/or data extracted from the body of an email or other message, such as a chat. The subject data may be associated with data from a subject line of an email or other message. The participant data may be associated with one or more participants of an email chain, other message chain, or conversation. The participant data may include a participant name, a number of interactions that the participant had in a given email chain, other message chain, or conversation, a duration of one or more interactions that the participant had in a given email chain, other message chain, or conversation, and/or a date and time of the last interaction that the participant had in a given email chain, or message chain, or conversation.

The conference data 420 may include data from calendar applications. For example, the conference data 420 may include data such as a date and time of a scheduled conference or meeting, invited participants, attended/attending participants, location information, topic information, or any combination thereof. The conference data 420 may include data associated with in-progress conferences, already completed conferences, and/or future conferences. In some cases, the conference data 420 may include data associated with transcriptions from one or more such conferences.

The document data 422 may include data from one or more document processing applications. The document data 422 may include data associated with one or more shared documents. Examples of shared documents may include, and are not limited to, shared spreadsheet documents, shared presentation documents, shared word processing documents, shared images, and other productivity documents. The document data 422 may include a document type, a document name, shared users of the document, a project associated with the document, a duration of time that a given user edited or viewed the document, a time when the document was last edited or viewed by a given user, or any combination thereof.

The task data 424 may include data from one or more task management applications. The task data 424 may include data associated with one or more shared tasks. The task data 424 may include a task type, a task name, shared users of the task, a project associated with the task, a time when the task was last viewed or completed by a given user, or any combination thereof.

The channel data 426 may include data from one or more channel applications. The channel data 426 may include data associated with one or more web feeds that allows users and applications to access updates to websites in a standardized, computer-readable format. Users and applications can subscribe to one or more web feeds, such as Really Simple Syndication (RSS) feeds, that can allow a user to keep track of many different websites in a single information aggregator, which constantly monitors sites for new content. The channel data 426 may include data associated with one or more shared channels. The channel data 426 may include a channel name, a channel address, shared subscribers of the channel, a project associated with the channel, a time when a channel was last accessed by a given user, or any combination thereof.

The dynamic user profile generator 412 is software configured to receive a request 428 from a user of the requesting device 404. The request 428 may be transmitted by the requesting device 404 in response to receiving an input from the user. The input may be obtained by the requesting device 404 via a profile card using a device interface, and may be a touch input, a gesture input, or a voice input. The request 428 may indicate a request for a dynamic user profile of another user of a device, such as the target device 406. The request 428 may include a user identifier of the user of the requesting device 404, a user identifier of the user of the target device 406, or both. Each user identifier may be an identifier associated with a respective user account, such as a user name, an email address, a phone extension, or any other identifier that can identify a user account. In response to the request 428, the dynamic user profile generator 412 is configured to obtain profile information 430 of the user of the target device 406 from the database 408. The profile information 430 may be obtained based on an interaction metric between the user of the requesting device 404 and the user of the target device 406, a relevance metric of one or more elements of the data stored in the database 408, a recency metric of one or more elements of the data stored in the database 408, or any combination thereof.

The relevance metric may be based on an interaction metric and one or more elements of the data stored in the database 408. For example, if the interaction metric is low (i.e., a low level of interaction between two or more users) and the two or more users do not have a shared task, the relevance metric for elements associated with the task data 424 would be low. In this example, even if the interaction metric is high, the relevance metric for elements associated with the task data 424 would be low since the users do not have any shared tasks. Since the relevance metric is low, the dynamic user profile generator 412 would not obtain the task data 424. In another example, if the interaction metric is high, and the two or more users have a scheduled conference associated with a given project and share one or more documents associated with the given project, the relevance metric for the one or more documents associated with the given project would be high. In this example, the document data 422 associated with the one or more documents may be obtained as profile information 430 by the dynamic user profile generator 412.

The recency metric may be based on an interaction metric and an amount of time that has passed since the last interaction. The recency metric decreases as the time that has passed since the last interaction increases. For example, if an interaction metric is high and the amount of time that has passed since at least one user of the two or more users accessed a document is below a threshold, the recency metric would be high, and the document data 422 associated with the document may be obtained as profile information 430 by the dynamic user profile generator 412. If the time that has passed is greater than a threshold, the recency metric would be low, and the dynamic user profile generator 412 may determine that the document is stale and not obtain the document data 422 associated with the document.

The dynamic user profile generator 412 is configured to generate a dynamic user profile for the user of the target device 406 based on the obtained profile information 430. The dynamic user profile is specific to the user, and is based on the relationship between the user and the other user. For example, if two different users request a dynamic user profile of another user, the two different users will be provided with different dynamic user profiles of the other user based on their respective relationships with the other user. One way to determine what is displayed in the dynamic user profile may be to use a tool that gauges the strength of relationships between users, such as a social graph tool. The dynamic user profile generator 412 is configured to output 432 the dynamic user profile for display on the requesting device 404 as a contact view of a profile card. In some examples, the profile card may be displayed as a workspace between two or more users.

To illustrate an example use case of the system 400 generating and providing a dynamic user profile, a requesting user may be preparing for a conference with a target user. In this example, the requesting user and the target user may have established a relationship over the course of several interactions. The interaction monitor 410 has monitored these interactions between the requesting user and the target user and generated an interaction metric that represents a relationship between the requesting user and the target user.

As part of the preparation for the conference, the requesting user provides an input to view the profile card of the target user, and a request is transmitted from the requesting device 404 to the dynamic user profile generator 412. The dynamic user profile generator 412 then generates a dynamic user profile of the target user based on the interaction metric. The dynamic user profile may include information that the system 400 determines may be most relevant to the requesting user based on the interaction metric. For example, if the requesting user and the target user recently collaborated on a document, the dynamic user profile generator 412 may include that document, a link to that document, a summary of that document, or any combination thereof, in the dynamic user profile of the target user. The dynamic user profile may be displayed as a profile card on a display of a requesting device 404 of the requesting user.

Figure 5B:
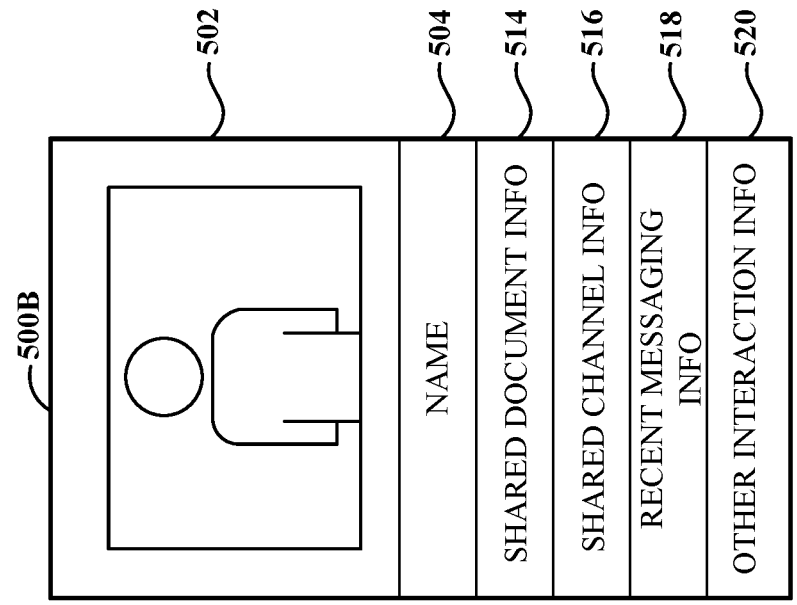
FIG. 5B is a diagram of an example of a contact view of a profile card of a user at a later stage of a relationship between the user and another user where a current level of interaction is high.
Figure 5A:
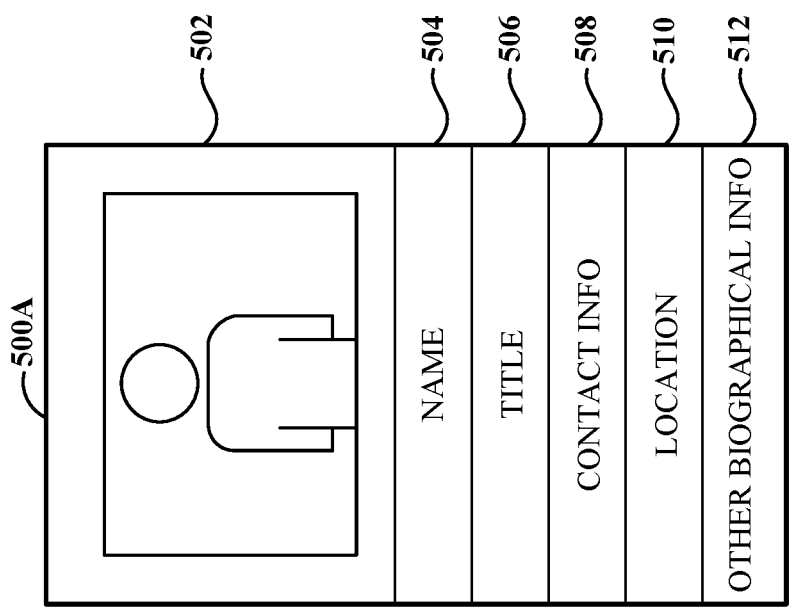
FIG. 5A is a diagram of an example of a contact view of a profile card of a user at an initial stage of a relationship between the user and another user where a current level of interaction is low.

FIG. 5A is a diagram of an example of a contact view of a profile card 500A of a user at an initial stage of a relationship between the user and another user where a current level of interaction is low, such as during an initial stage of a relationship. The profile card 500A may be based on the dynamic user profile generated by the system 400 shown in FIG. 4. At an initial stage of a relationship, biographical information of the user may be relevant to another user. As shown in FIG. 5A, the profile card 500A includes biographical information based on a dynamic user profile in various panels such as an image panel 502, a name panel 504, a title panel 506, a contact information panel 508, a location panel 510, and other biographical information panel 512.

The image panel 502 may include an image of the user associated with the profile card 500A. The name panel 504 may include a name of the user including, for example, a first name or initial, a last name or initial, a middle name or initial, a nickname, a user name, a handle, some other identifier associated with the user, or any combination thereof. The title panel 506 includes a title of the user, for example, a position within a company. The contact information panel 508 includes contact information such as an email address, one or more phone numbers, a phone extension, some other information to contact the user, such as a social media link, or any combination thereof. The location panel 510 includes a location of the user. The location may include an image of a map, a geographic region, a company office, an address, geolocation coordinates, or any combination thereof. The other biographical information panel 512 may include other biographical information, such as department information, education information, personal information such as hobbies or interests, or the like.

FIG. 5B is a diagram of an example of a contact view of a profile card 500B of a user at a later stage of a relationship between the user and another user where a current level of interaction is high. The profile card 500B is an example of the profile card 500A as the relationship between the user and the other user matures. For example, as the relationship matures, the other user may no longer be interested in viewing the user's title because the user's title is known at this point in the relationship. Accordingly, the profile card 500A is dynamically updated as the relationship matures to display more relevant information as shown in profile card 500B. As shown in FIG. 5B, the profile card 500B includes information based on a dynamic user profile in various panels such as the image panel 502, the name panel 504, a shared document information panel 514, a shared channel information panel 516, a recent chat information panel 518, and other interaction information panel 520. These panels are exemplary and may change based on the dynamic user profile. For example, a title panel, such as the title panel 506 may be included if there is a change in the user's title.

The image panel 502 and the name panel 504 may be persistent panels, and therefore may include the same information as in the profile card 500A. The shared document information panel 514 includes information associated with one or more documents that are shared between the users. The shared document information panel 514 may include one or more images, such as an icon representing a document, or a link to a document. In an example, the image or link may be interactive such that the document is automatically downloaded when the user clicks on the image or link. The shared channel information panel 516 includes information associated with one or more channels that are shared between the users. The shared channel information panel 516 may include one or more images, such as an icon representing a channel, or a link to a channel. In an example, the image or link may be interactive such that the associated channel application is opened when the user clicks on the image or link. The recent messaging information panel 518 includes information associated with one or more messages between the users. The messages may be from an email application, a chat application, an instant messaging application, or another messaging application. In an example, the recent messaging information panel 518 may include a summary of a recent message or conversation between the users, one or more images, such as an icon representing a messaging application that was recently used by the users, or a link to a messaging application that was recently used by the users. The image or link may be interactive such that the associated messaging application is opened when the user clicks on the image or link such that the user can view the associated message. The other interaction information panel 512 may include other interaction information, such as shared conference information, shared task information, or the like.

To further describe some implementations in greater detail, reference is next made to examples of methods that may be performed by or using a system to implement dynamic user profiles. The methods 600 through 900 can be executed using computing devices, such as the systems, hardware, and software described with respect to FIGS. 1-5B. The methods 600 through 900 can be performed, for example, by executing a machine-readable program or other computer-executable instructions, such as routines, instructions, programs, or other code. The steps, or operations, of the methods 600 through 900 or other techniques, methods, processes, or algorithms described in connection with the implementations disclosed herein can be implemented directly in hardware, firmware, software executed by hardware, circuitry, or a combination thereof.

For simplicity of explanation, the methods 600 through 900 are depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Figure 6:
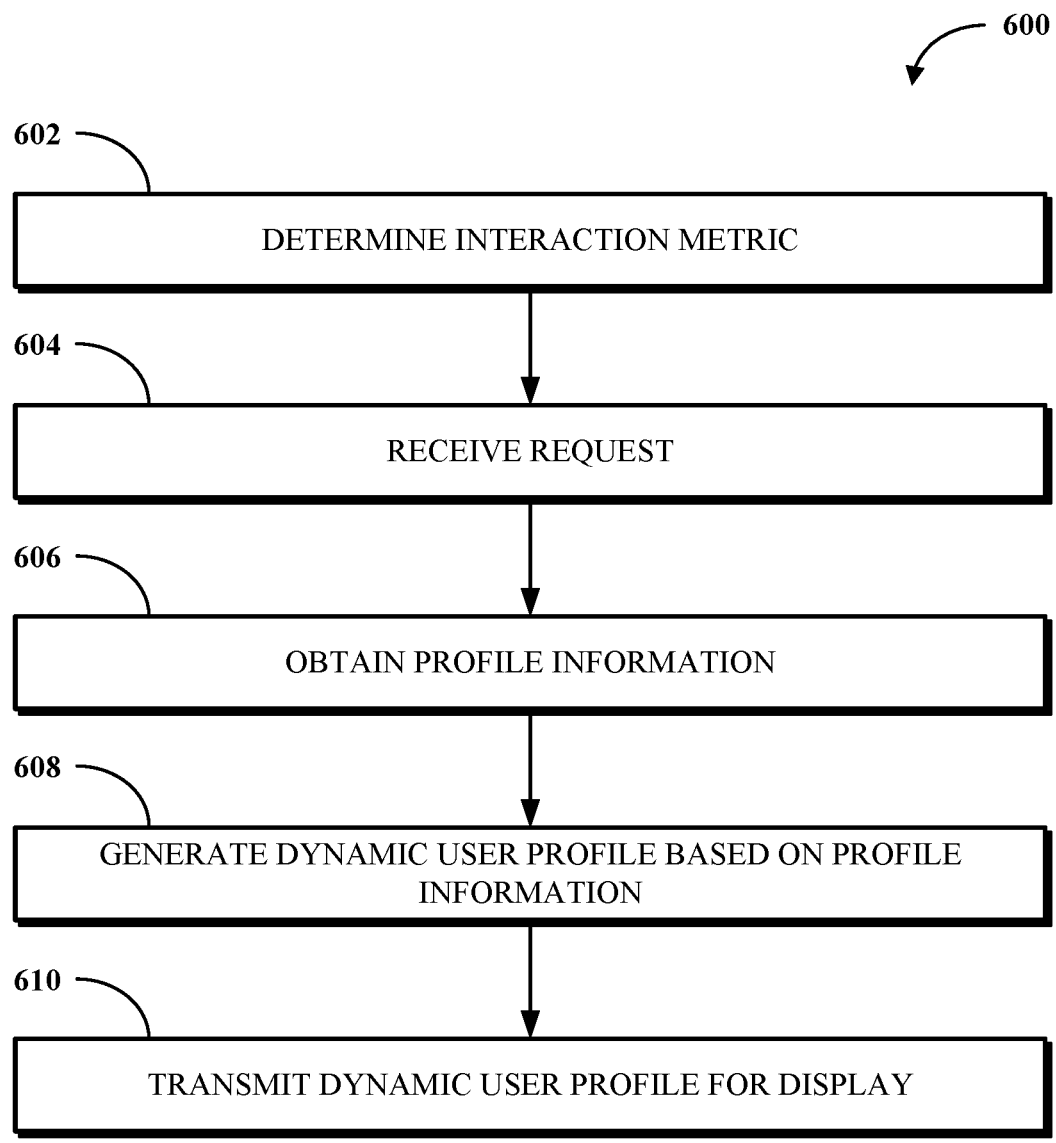
FIG. 6 is a flowchart of an example of a method for generating a dynamic user profile.

FIG. 6 is a flowchart of an example of a method 600 for generating a dynamic user profile. At 602, the method 600 includes determining an interaction metric between a requesting user of a requesting device associated with a software platform and a target user of a target device associated with the software platform. The interaction metric is based on a level of interaction between the requesting user and the target user. The level of interaction may be determined based on one or more of the following example interactions between the requesting user and the target user over a software service of the software platform. For example, the level of interaction may be determined based on a number of interactions between the requesting user and the target user. In another example, the level of interaction may be determined based on a duration of at least one interaction between the requesting user and the target user. The level of interaction may be determined based on a frequency of interactions, for example, a frequency of interactions between the requesting user and the target user. In yet another example, the level of interaction may be determined based on a number of shared files between the requesting user and the target user, a number of shared tasks between the requesting user and the target user, a number of prior shared conferences between the requesting user and the target user, a number of future shared conferences between the requesting user and the target user, or any combination thereof.

At 604, the method 600 includes receiving a request. The request may be received from the requesting device of the requesting user. In some examples, the request may be received prior to the determination of the interaction metric. The request may be a request for a dynamic user profile of the target user of the software platform. The dynamic user profile is specific to the requesting user, and is based on the relationship between the requesting user and the target user. The request may include a respective identifier for each of the requesting user and the target user. Each identifier may be associated with a respective user account, such as a user name, an email address, a phone extension, or any other identifier that can identify a user account.

At 606, the method 600 includes obtaining profile information of the target user. The profile information of the target user is obtained in response to the request. The profile information may be obtained based on the interaction metric between the requesting user and the target user, a relevance metric of one or more elements, a recency metric of one or more elements, or any combination thereof. The one or more elements may be associated with messaging data, conference data, document data, task data, channel data, or any combination thereof.

At 608, the method 600 includes generating a dynamic user profile based on the obtained profile information. The dynamic user profile is specific to the requesting user, such that two different requesting users will be provided with different dynamic user profiles of the target user based on their respective relationships with the target user. The dynamic user profile may be generated by determining associations between messaging data, conference data, document data, task data, and channel data between the requesting user and the target user, and determining which data to include in the dynamic user profile based on the interaction metric between the requesting user and the target user. In some examples, determining which data to include in the dynamic user profile may be based on an interaction metric that includes a relevancy metric, a recency metric, or both.

At 610, the method 600 includes transmitting the dynamic user profile for display. The dynamic user profile can be displayed on the requesting device as a profile card of the target user. In some examples, the profile card may be displayed as a workspace between two or more users to allow a team of users to collaborate without having to log into multiple applications.

Figure 7:
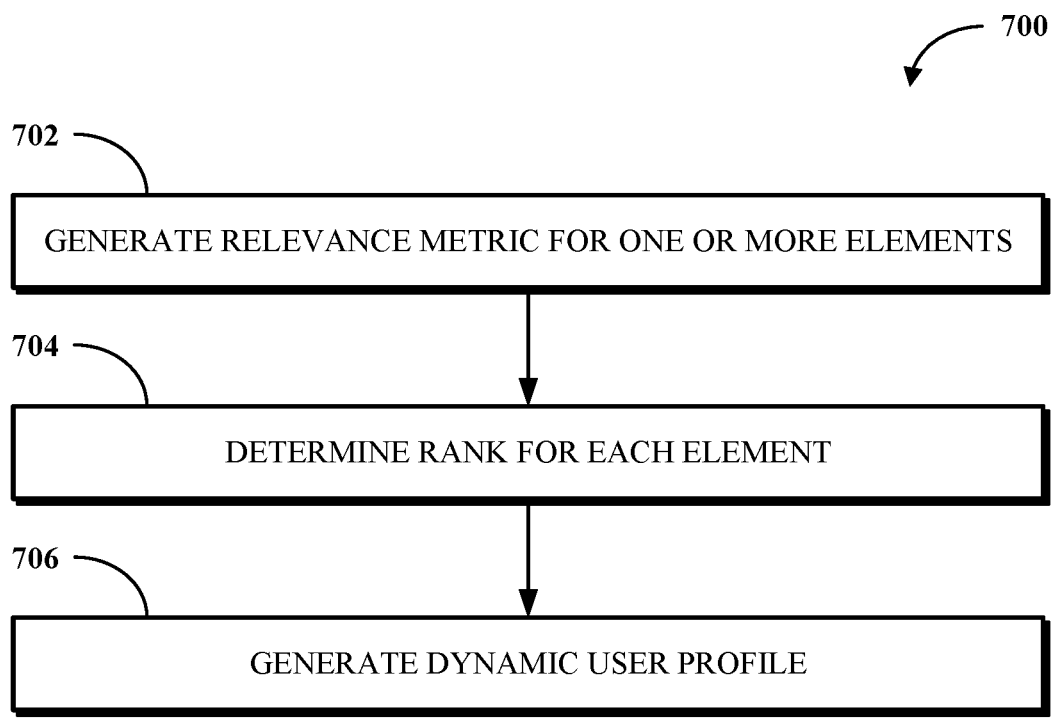
FIG. 7 is a flowchart of an example of a method for determining an interaction metric.

FIG. 7 is a flowchart of an example of a method 700 for determining an interaction metric. In some examples, the method 700 may be performed in conjunction with the method 600 shown in FIG. 6. In this example, the profile information obtained at 606 in FIG. 6 may include one or more elements associated with messaging data, conference data, document data, task data, and channel data.

At 702, the method 700 includes generating a relevance metric for each of the one or more elements. The relevance metric may be generated as an integer value. Generating the relevance metric may include determining associations between messaging data, conference data, document data, task data, and channel data between a requesting user and a target user, and determining shared elements between the requesting user and the target user. For example, if it is determined that a shared document exists between the requesting user and the target user, and the shared document is referenced in one or more messages, the relevance metric for that document would be higher than a relevance metric for a document that was not referenced in a message. Similarly, if the shared document is referenced in a message and a task, the relevance metric would be higher than if the shared document was only referenced in a message.

At 704, the method 700 includes determining a rank for each element. The rank for each element is based on the integer value of the respective relevance metric. Each element may then be ranked in descending order, with the highest ranked elements being the most relevant.

At 706, the method 700 includes generating a dynamic user profile. The dynamic user profile is generated based on the rank of each element. For example, the dynamic user profile may include one or more elements that have the highest overall ranking. In another example, the dynamic user profile may include one or more elements for each category that each have the highest rankings for the respective categories. For example, the dynamic user profile may include, based on the ranking, one or more elements of a message category, one or more elements of a document category, one or more elements of a task category, one or more elements of a channel category, or any combination thereof.

Figure 8:
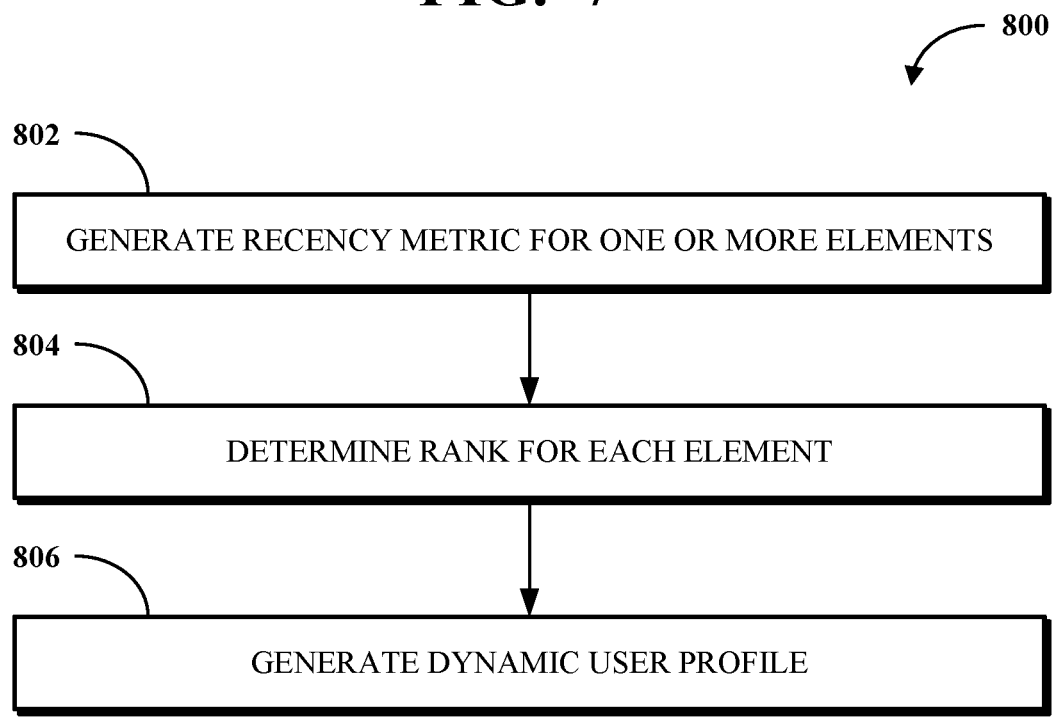
FIG. 8 is a flowchart of another example of a method for determining an interaction metric.

FIG. 8 is a flowchart of another example of a method 800 for determining an interaction metric. In some examples, the method 800 may be performed in conjunction with the method 600 shown in FIG. 6, the method 700 shown in FIG. 7, or both. In this example, the profile information obtained at 606 in FIG. 6 may include one or more elements associated with messaging data, conference data, document data, task data, and channel data.

At 802, the method 700 includes generating a recency metric for each of the one or more elements. The recency metric may be generated as an integer value. Generating the recency metric may include determining associations between messaging data, conference data, document data, task data, and channel data between a requesting user and a target user, determining shared elements between the requesting user and the target user, and determining a time of last access for each element by each user. For example, if it is determined that a shared channel exists between the requesting user and the target user, and the shared channel was accessed by the requesting user, the target user, or both, within a predetermined time of the current time, the recency metric for that channel would be higher than a recency metric for a channel that was not accessed within the predetermined time of the current time.

At 804, the method 800 includes determining a rank for each element. The rank for each element is based on the integer value of the respective recency metric. Each element may then be ranked in descending order, with the highest ranked elements being the most recent.

At 806, the method 800 includes generating a dynamic user profile. The dynamic user profile is generated based on the rank of each element. For example, the dynamic user profile may include one or more elements that have the highest overall ranking. In another example, the dynamic user profile may include one or more elements for each category that each have the highest rankings for the respective categories. For example, the dynamic user profile may include, based on the ranking, one or more elements of a message category, one or more elements of a document category, one or more elements of a task category, one or more elements of a channel category, or any combination thereof.

Figure 9:
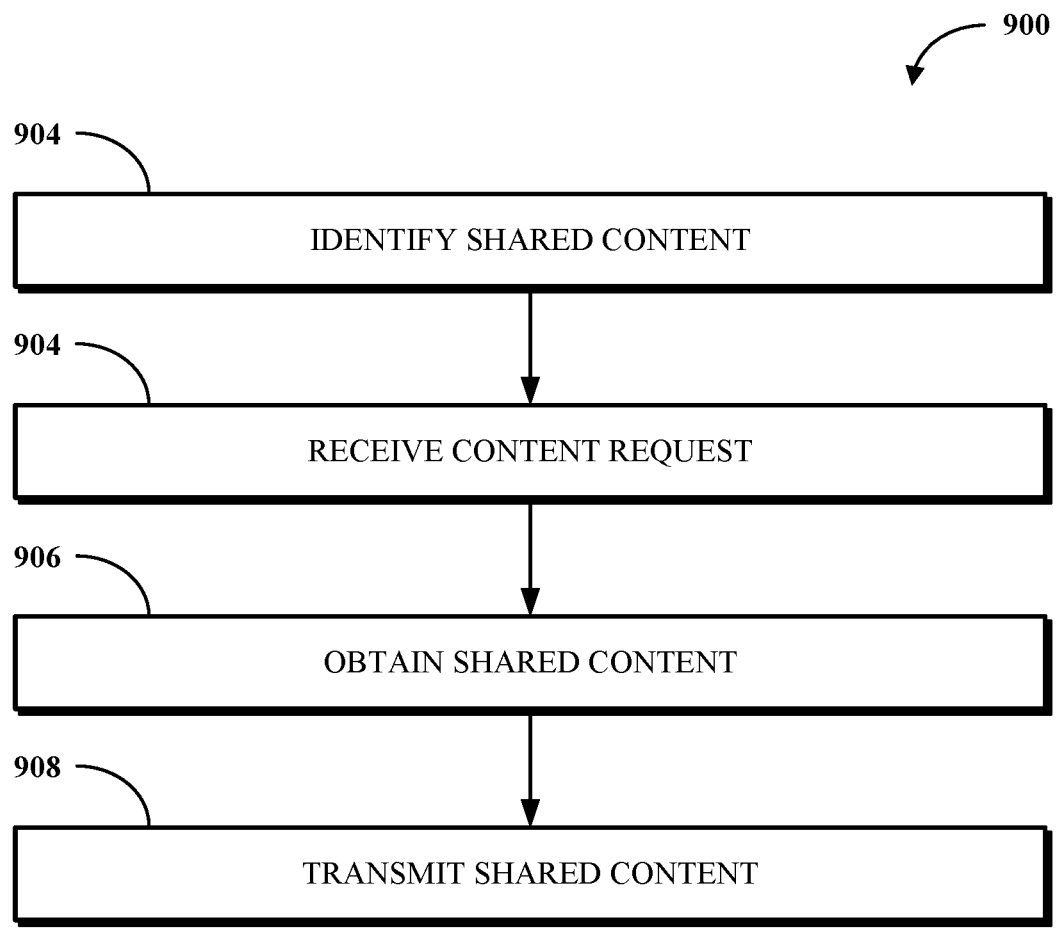
FIG. 9 is a flowchart of an example of a method for displaying shared content in a dynamic user profile.

FIG. 9 is a flowchart of an example of a method 900 for displaying shared content in a dynamic user profile. In some examples, the method 900 may be performed in conjunction with the method 600 shown in FIG. 6, the method 700 shown in FIG. 7, the method 800 shown in FIG. 8, or any combination thereof. At 902, the method 900 includes identifying shared content between two or more users. The shared content may include, and is not limited to, files such as document files, image files, video files, audio files, and the like, messages such as emails and other messages, and tasks. The video files and audio files may include conference recordings. The identified shared content may be stored in a database.

At 904, the method 900 includes receiving a content request. The content request may include a request that indicates one or more items of shared content. The content request may be received from a requesting device of a requesting user of the two or more users. The content request may be transmitted from the requesting device in response to an input from the requesting user. The input may be obtained via a profile card using a device interface, and may be a touch input, a gesture input, or a voice input.

At 906, the method 900 includes obtaining shared content. The shared content is obtained based on the shared content indicated in the content request.

At 908, the method 900 includes transmitting the shared content. The shared content is transmitted to the requesting device that transmitted the content request. The shared content can be displayed on the requesting device that transmitted the content request.

In an aspect, a method may include determining an interaction metric between a first user of a software platform and a second user of the software platform. The interaction metric may be associated with a level of interaction between the first user and the second user. The method may include receiving, from a first user device associated with the first user, a request for a dynamic user profile of the second user. The method may include obtaining profile information of the second user based on the interaction metric. The method may include generating the dynamic user profile based on the profile information. The method may include transmitting the dynamic user profile to the first user device for display. The dynamic user profile may be specific to the first user.

In an aspect, a software platform may include an interaction monitor and a dynamic user profile generator. The interaction monitor may be configured to determine an interaction metric between a first user of a software platform and a second user of the software platform. The interaction metric may be associated with a level of interaction between the first user and the second user. The dynamic user profile generator may be configured to receive, from a first user device associated with the first user, a request for a dynamic user profile of the second user. The dynamic user profile generator may be configured to obtain profile information of the second user based on the interaction metric. The dynamic user profile generator may be configured to generate the dynamic user profile based on the profile information. The dynamic user profile generator may be configured to transmit the dynamic user profile to the first user device for display. The dynamic user profile may be specific to the first user.

In an aspect, a non-transitory computer-readable medium may include stored instructions that when executed by a processor cause the processor to perform operations. The operations may include determining an interaction metric between a first user of a software platform and a second user of the software platform. The interaction metric may be associated with a level of interaction between the first user and the second user. The operations may include receiving, from a first user device associated with the first user, a request for a dynamic user profile of the second user. The operations may include obtaining, based on the request, profile information of the second user based on the interaction metric. The operations may include generating the dynamic user profile based on the profile information. The operations may include transmitting the dynamic user profile to the first user device for display. The dynamic user profile may be specific to the first user.

In one or more aspects, the level of interaction may be based on at least one of a number of interactions between the first user and the second user over a software service of the software platform, a duration of at least one interaction between the first user and the second user over the software service of the software platform, or a frequency of interactions between the first user and the second user over the software service of the software platform. In one or more aspects, the level of interaction may be based on at least one of a number of shared files between the first user and the second user over the software service of the software platform, a number of shared tasks between the first user and the second user over the software service of the software platform, a number of prior shared conferences between the first user and the second user over the software service of the software platform, or a number of future shared conferences between the first user and the second user over the software service of the software platform.

In one or more aspects, the profile information may include a plurality of elements. In one or more aspects, generating the dynamic user profile based on the profile information may include generating a relevance metric for each of the plurality of elements. In one or more aspects, generating the dynamic user profile based on the profile information may include determining a rank for each of the plurality of elements based on a respective relevance metric. In one or more aspects, generating the dynamic user profile based on the profile information may include generating the dynamic user profile based on the rank of each of the plurality of elements. In one or more aspects, generating the dynamic user profile based on the profile information may include generating a recency metric for each of the plurality of element. In one or more aspects, generating the dynamic user profile based on the profile information may include determining a rank for each of the plurality of elements based on a respective recency metric. In one or more aspects, generating the dynamic user profile based on the profile information may include generating the dynamic user profile based on the rank of each of the plurality of elements.

In one or more aspects, the dynamic user profile may identify shared content between the first user and the second user. One or more aspects may include receiving, from the first user device, a content request for the shared content. One or more aspects may include obtaining the shared content based on the content request. One or more aspects may include transmitting the shared content to the first user device. In one or more aspects, the dynamic user profile may be associated with a profile card of the second user. The profile card may be configured to be displayed as a workspace between the first user and the second user.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
   determining a level of interaction between a first user of a software platform and a second user of the software platform;
   receiving, from a first user device associated with the first user, a request for a dynamic user profile of the second user;
   obtaining profile information of the second user, wherein the profile information is based on the level of interaction between the first user and the second user, wherein the level of interaction is based on a number of future shared conferences between the first user and the second user;
   generating the dynamic user profile based on the profile information, wherein the dynamic user profile includes a summary of a recent conversation, shared public channels, recent conferences, and future conferences between the first user and the second user; and transmitting the dynamic user profile to the first user device for display, wherein the dynamic user profile is unique to the first user based on the level of interaction between the first user and the second user.

2. The method of claim 1, wherein the level of interaction is further based on at least one of a number of interactions between the first user and the second user over a software service of the software platform, a duration of at least one interaction between the first user and the second user over the software service of the software platform, or a frequency of interactions between the first user and the second user over the software service of the software platform.

3. The method of claim 1, wherein the level of interaction is further based on at least one of a number of shared files between the first user and the second user over the software service of the software platform, a number of shared tasks between the first user and the second user over the software service of the software platform, or a number of prior shared conferences between the first user and the second user over the software service of the software platform.

4. The method of claim 1, wherein the profile information includes a plurality of elements, and wherein generating the dynamic user profile based on the profile information comprises:
generating a relevance metric for each of the plurality of elements;
determining a rank for each of the plurality of elements based on a respective relevance metric; and
generating the dynamic user profile based on the rank of each of the plurality of elements.

5. The method of claim 1, wherein the profile information includes a plurality of elements, and wherein generating the dynamic user profile based on the profile information comprises:
generating a recency metric for each of the plurality of elements;
determining a rank for each of the plurality of elements based on a respective recency metric; and
generating the dynamic user profile based on the rank of each of the plurality of elements.

6. The method of claim 1, wherein the dynamic user profile identifies shared content between the first user and the second user, the method further comprising:
receiving, from the first user device, a content request for the shared content;
obtaining the shared content based on the content request; and
transmitting the shared content to the first user device.

7. The method of claim 1, wherein the dynamic user profile is associated with a profile card of the second user, wherein the profile card is configured to be displayed as a workspace between the first user and the second user.

8. A software platform comprising:
a processor configured to execute an interaction monitor to determine a level of interaction between a first user of a software platform and a second user of the software platform; and
the processor configured to execute a dynamic user profile generator to:
receive, from a first user device associated with the first user, a request for a dynamic user profile of the second user;
obtain profile information of the second user, wherein the profile information is based on the level of interaction between the first user and the second user, wherein the level of interaction is based on a number of future shared conferences between the first user and the second user;
generate the dynamic user profile based on the profile information, wherein the dynamic user profile includes a summary of a recent conversation, shared public channels, recent conferences, and future conferences between the first user and the second user; and
transmit the dynamic user profile to the first user device for display, wherein the dynamic user profile is unique to the first user based on the level of interaction between the first user and the second user.

9. The software platform of claim 8, wherein the level of interaction is further based on at least one of a number of interactions between the first user and the second user over a software service of the software platform, a duration of at least one interaction between the first user and the second user over the software service of the software platform, or a frequency of interactions between the first user and the second user over the software service of the software platform.

10. The software platform of claim 8, wherein the level of interaction is further based on at least one of a number of shared files between the first user and the second user over the software service of the software platform, a number of shared tasks between the first user and the second user over the software service of the software platform, or a number of prior shared conferences between the first user and the second user over the software service of the software platform.

11. The software platform of claim 8, wherein the profile information includes a plurality of elements, and wherein the processor is configured to execute the dynamic user profile generator to:
generate a relevance metric for each of the plurality of elements;
determine a rank for each of the plurality of elements based on a respective relevance metric; and
generate the dynamic user profile based on the rank of each of the plurality of elements.

12. The software platform of claim 8, wherein the profile information includes a plurality of elements, and wherein the processor is configured to execute the dynamic user profile generator to:
generate a recency metric for each of the plurality of elements;
determine a rank for each of the plurality of elements based on a respective recency metric; and
generate the dynamic user profile based on the rank of each of the plurality of elements.

13. The software platform of claim 8, wherein the dynamic user profile identifies shared content between the first user and the second user, and wherein the processor is configured to execute the dynamic user profile generator to:
receive, from the first user device, a content request for the shared content;
obtain the shared content based on the content request; and
transmit the shared content to the first user device.

14. The software platform of claim 8, wherein the dynamic user profile is associated with a profile card of the second user, wherein the profile card is configured to be displayed as a workspace between the first user and the second user.

15. A non-transitory computer-readable medium comprising stored instructions that when executed by a processor cause the processor to perform operations comprising:
- determining a level of interaction between a first user of a software platform and a second user of the software platform;
- receiving, from a first user device associated with the first user, a request for a dynamic user profile of the second user;
- obtaining profile information of the second user, wherein the profile information is based on the level of interaction between the first user and the second user, wherein the level of interaction is based on a number of future shared conferences between the first user and the second user;
- generating the dynamic user profile based on the profile information, wherein the dynamic user profile includes a summary of a recent conversation, shared public channels, recent conferences, and future conferences between the first user and the second user; and
- transmitting the dynamic user profile to the first user device for display, wherein the dynamic user profile is unique to the first user based on the level of interaction between the first user and the second user.

16. The non-transitory computer-readable medium of claim 15, wherein the level of interaction is further based on at least one of a number of interactions between the first user and the second user over a software service of the software platform, a duration of at least one interaction between the first user and the second user over the software service of the software platform, or a frequency of interactions between the first user and the second user over the software service of the software platform.

17. The non-transitory computer-readable medium of claim 15, wherein the level of interaction is further based on at least one of a number of shared files between the first user and the second user over the software service of the software platform, a number of shared tasks between the first user and the second user over the software service of the software platform, or a number of prior shared conferences between the first user and the second user over the software service of the software platform.

18. The non-transitory computer-readable medium of claim 15, wherein the profile information includes a plurality of elements, and wherein the processor performs operations further comprising:
- generating a relevance metric for each of the plurality of elements;
- determining a rank for each of the plurality of elements based on a respective relevance metric; and
- generating the dynamic user profile based on the rank of each of the plurality of elements.

19. The non-transitory computer-readable medium of claim 15, wherein the profile information includes a plurality of elements, and wherein the processor performs operations further comprising:
- generating a recency metric for each of the plurality of elements;
- determining a rank for each of the plurality of elements based on a respective recency metric; and
- generating the dynamic user profile based on the rank of each of the plurality of elements.

20. The non-transitory computer-readable medium of claim 15, wherein the dynamic user profile identifies shared content between the first user and the second user, and wherein the processor performs operations further comprising:
- receiving, from the first user device, a content request for the shared content;
- obtaining the shared content based on the content request; and
- transmitting the shared content to the first user device.

* * * * *